(12) United States Patent
Kakuma et al.

(10) Patent No.: US 7,497,879 B2
(45) Date of Patent: Mar. 3, 2009

(54) METHOD OF MANUFACTURING ELECTROLYTIC CAPACITOR AND ELECTROLYTIC CAPACITOR

(75) Inventors: Kenji Kakuma, Izumo (JP); Masakazu Hosogi, Unnan (JP)

(73) Assignees: Sanyo Electric Co., Ltd., Moriguchi-shi (JP); Sun Electronic Industries Corp., Shijonawate-shi (JP)

( * ) Notice: Subject to any disclaimer, the term of this patent is extended or adjusted under 35 U.S.C. 154(b) by 0 days.

(21) Appl. No.: 11/819,581

(22) Filed: Jun. 28, 2007

(65) Prior Publication Data

US 2008/0002334 A1 Jan. 3, 2008

(30) Foreign Application Priority Data

Jun. 29, 2006 (JP) ............................. 2006-180043

(51) Int. Cl.
*H01G 9/00* (2006.01)
(52) U.S. Cl. ................... 29/25.03; 361/502; 361/503; 361/511; 361/523; 257/E21.008
(58) Field of Classification Search .................. None
See application file for complete search history.

(56) References Cited

U.S. PATENT DOCUMENTS 5,485,346 A * 1/1996 Kanbara et al. ............ 361/504
6,519,137 B1 * 2/2003 Nitta et al. ................. 361/525
6,962,612 B1 * 11/2005 Saito et al. ................. 29/25.03

FOREIGN PATENT DOCUMENTS

| JP | 02-015611 A | 1/1990 |
| JP | 05-144677 A | 6/1993 |
| JP | 11-186110 A | 7/1999 |
| JP | 2005-322917 A | 11/2005 |

* cited by examiner

*Primary Examiner*—N Drew Richards
*Assistant Examiner*—Kyoung Lee
(74) *Attorney, Agent, or Firm*—Westerman, Hattori, Daniels & Adrian, LLP.

(57) ABSTRACT

A method of manufacturing an electrolytic capacitor including the following steps as well as an electrolytic capacitor manufactured by the method are provided. The method includes: a dispersion impregnation step of impregnating, with a dispersion containing electrically conductive solid particles or powder and a solvent, a capacitor element having an anode foil with a dielectric coating film formed thereon and an opposite cathode foil that are wound with a separator interposed therebetween; a dry step of evaporating the solvent after the dispersion impregnation step to form an electrically conductive solid layer on a surface of the dielectric coating film; and an electrolytic solution impregnation step of impregnating a gap in the electrically conductive solid layer with an electrolytic solution. Accordingly, an electrolytic capacitor that can be manufactured more easily that is excellent in voltage proofing property and that has a lower ESR and a lower leakage current is provided.

7 Claims, 1 Drawing Sheet

METHOD OF MANUFACTURING ELECTROLYTIC CAPACITOR AND ELECTROLYTIC CAPACITOR

BACKGROUND OF THE INVENTION

1. Field of the Invention

The present invention relates to a method of manufacturing an electrolytic capacitor and to an electrolytic capacitor obtained by the manufacturing method. More specifically, the invention relates to a method of manufacturing a wound electrolytic capacitor and an electrolytic capacitor obtained by the manufacturing method.

2. Description of the Background Art

As digitization of electronic equipment proceeds, it has become required that capacitors used therefor have a smaller size, a larger capacitance and a smaller Equivalent Series Resistance (hereinafter abbreviated as ESR) in a high-frequency range.

As capacitors for a high-frequency range, plastic film capacitors and multilayer ceramic capacitors for example have conventionally been used frequently. Such capacitors, however, have a relatively small capacitance.

An example of a small-sized, large-capacitance and low-ESR capacitor is an electrolytic capacitor having, as a cathode material, such an electron conducting material as manganese dioxide or TCNQ complex salt. Here, TCNQ refers to 7,7,8,8-tetracyanoquinodimethane. Further, an electrolytic capacitor for which such an electrically conductive polymer as polypyrrole, polythiophene, polyfuran or polyaniline is used is also a promising capacitor. For example, Japanese Patent Laying-Open No. 02-015611 discloses an electrolytic capacitor including a specific polythiophene as a solid electrolyte.

In manufacturing an electrolytic capacitor having such an electrically conductive polymer as described above as a cathode material, on a surface of a sintered anode or anode foil made of such a valve metal as aluminum or tantalum for example, a chemical conversion coating film, an electrically conductive polymer layer, a graphite layer and a silver paint layer are formed successively, to which a cathode lead is connected by means of an electrically conductive adhesive or the like. This method, namely the cathode draw-out method is considerably complicated as compared with the method impregnating, with an electrolytic solution, a capacitor element including an anode foil on which a chemical conversion coating film is formed and an opposite cathode foil that are wound or rolled with a separator therebetween, which is a method of manufacturing a so-called wound electrolytic capacitor. Further, the cathode draw-out method tends to provide a larger ESR as compared with a wound electrolytic capacitor using the opposite cathode foil.

In manufacturing a wound electrolytic capacitor, the electrically conductive polymer layer as described above can be formed using, for example, electrolytic polymerization method or vapor phase polymerization method. However, it is operationally complicated and difficult to form an electrically conductive polymer layer within a wound capacitor element using the electrolytic polymerization or vapor phase polymerization method. A possible method forms, on an anode foil, a chemical conversion coating film and an electrically conductive polymer layer and thereafter winds them together with the opposite cathode foil. However, it is difficult to wind the chemical conversion coating film and the electrically conductive polymer layer without damage to them and to accordingly form a wound electrolytic capacitor.

Further, the electrically conductive polymer layer can also be formed by impregnating the wound capacitor element with a monomer that is polymerized to become the electrically conductive polymer as well as an oxidizing agent. For example, Japanese Patent Laying-Open No. 11-186110 discloses a method of forming an electrically conductive polymer by impregnating a wound capacitor element with a monomer that is to serve as electrically conductive polymer and thereafter immersing the capacitor element in an aqueous solution of such an oxidizing agent as ammonium persulfate. Furthermore, Japanese Patent Laying-Open No. 2005-322917 discloses a method of forming a solid electrolyte by supplying a mixture of a precursor used for manufacturing an electrically conductive polymer and an oxidizing agent into a porous electrode coated with a dielectric layer, and exposing the porous electrode impregnated with the mixture containing the precursor and the oxidizing agent to a certain relative moisture so as to polymerize the precursor. These methods, however, attach the oxidizing agent to the chemical conversion coating film on the anode and perform oxidation polymerization on the chemical conversion coating film. Therefore, the methods have a problem that the chemical conversion coating film is damaged and the chemical conversion coating film has a relatively large number of defects. Another problem is that the additional step of washing to remove the non-reacted monomer and oxidizing agent is required after the chemical oxidation polymerization, and thus the method is complicated.

Furthermore, Japanese Patent Laying-Open No. 05-144677 discloses a method of forming an electrically conductive polymer layer as described above by immersing a wound capacitor element in a solution in which such a soluble electrically-conductive polymer as polyaniline is dissolved, thereafter drying the capacitor element to remove the solvent. The method, however, has the problem that the electrically conductive polymer enters the inside of defects present in the chemical conversion coating film on the anode since the soluble conductive polymer is dissolved in the solvent, so that short-circuiting of the electrolytic capacitor is likely to occur and thus the voltage proofing properties are relatively poor.

SUMMARY OF THE INVENTION

The present invention has been made to solve the problems as described above, and an object of the invention is to provide a method of manufacturing an electrolytic capacitor that can be manufactured more easily as compared with the conventional one, that is excellent in voltage proofing properties and that has a smaller leakage current, and to provide an electrolytic capacitor obtained by the manufacturing method.

According to the present invention, a method of manufacturing an electrolytic capacitor includes: a dispersion impregnation step of impregnating, with a dispersion containing electrically conductive solid particles or powder and a solvent, a capacitor element having an anode foil with a dielectric coating film formed thereon and an opposite cathode foil that are wound with a separator interposed therebetween; a dry step of evaporating the solvent after the dispersion impregnation step to form an electrically conductive solid layer on a surface of the dielectric coating film; and an electrolytic solution impregnation step of impregnating a gap in the electrically conductive solid layer with an electrolytic solution. In the dry step, the electrically conductive solid layer may be formed on the surface of the dielectric coating film and on respective surfaces of the separator and the opposite cathode foil.

Preferably, an electrically conductive solid of which the electrically conductive solid layer is composed includes an electrically conductive polymer, the solvent contained in the dispersion includes water, and the electrolytic solution includes a non-aqueous solvent and an organic salt.

Preferably, regarding the method of manufacturing an electrolytic capacitor according to the present invention, the electrically conductive polymer includes one element or at least two elements selected from the group consisting of polypyrrole, polythiophene and derivatives thereof, the non-aqueous solvent includes γ-butyrolactone and/or sulfolane, and the organic salt includes an organic amine salt.

It is particularly preferable that the electrically conductive polymer is polyethylenedioxythiophene.

Preferably, the electrically conductive polymer is not substantially dissolved in the electrolytic solution.

The present invention also provides an electrolytic capacitor manufactured by any method as described above.

In accordance with the method of manufacturing an electrolytic capacitor of the present invention, the electrically conductive solid layer is formed by impregnating the capacitor element with the liquid in which the electrically conductive solid is dispersed. Therefore, the washing process after the polymerization reaction that has been required for the conventional method can be skipped, and thus the electrolytic capacitor can be manufactured relatively easily.

Further, in accordance with the method of manufacturing an electrolytic capacitor of the present invention, the electrolytic capacitor that is excellent in voltage proofing properties and that has a small leakage current can be provided. Furthermore, since the electrolytic capacitor of the present invention has the electrically conductive solid layer and is impregnated with the electrolytic solution, the capacitor has a reduced ESR and a high repairability of the dielectric coating film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment is shown to describe in more detail the method of manufacturing an electrolytic capacitor of the present invention.

<Dispersion Impregnation Step>

According to the method of manufacturing an electrolytic capacitor of the present invention, a capacitor element which has an anode foil with a dielectric coating film formed thereon and has an opposite cathode foil that are wound with a separator therebetween is firstly impregnated with a dispersion including electrically conductive solid particles or powder and a solvent.

Figure 1:
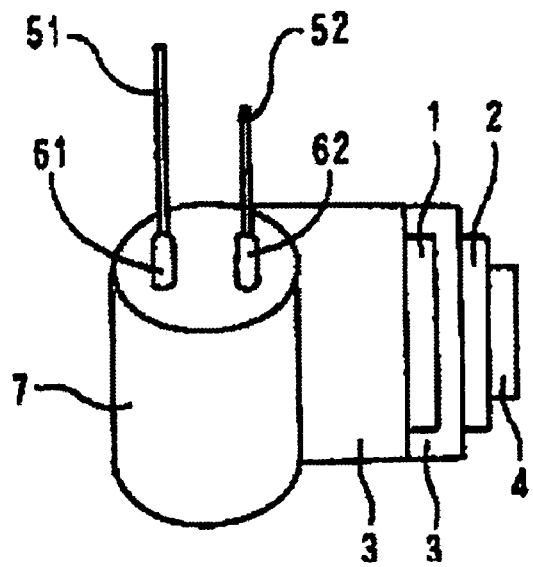
FIG. 1 is an exploded perspective view schematically showing an exemplary wound capacitor element preferably used for the present invention.

As the capacitor element which has an anode foil with a dielectric coating film formed thereon and has an opposite cathode foil that are wound with a separator therebetween, a wound capacitor element 7 constructed as shown in FIG. 1 for example is preferably used. Capacitor element 7 is formed by winding an anode foil 1 as described below and an opposite cathode foil 2 with a separator 3 therebetween. This anode foil is a foil which is made of such a valve metal as aluminum, tantalum, niobium or titanium and which undergoes an etching process for roughing the surface and a chemical conversion process for forming the dielectric coating film. The foils are wound and thereafter fixed by a winding end tape 4. To anode foil 1 and opposite cathode foil 2 respectively, leads 51, 52 are attached through lead tabs 61, 62.

The dispersion with which the capacitor element is impregnated includes electrically conductive solid particles or powder and a solvent. Here, the electrically conductive solid is for example manganese dioxide, TCNQ, electrically conductive polymer or the like, and the electrically conductive polymer is preferably used. Among electrically conductive polymers, preferably polypyrrole, polythiophene and respective derivatives thereof for example are used because of their high electrical conductivity. Among them, polyethylenedioxythiophene is particularly preferable since it has a considerably high electrical conductivity. The particle size of the electrically conductive solid particles or powder is not limited to a particular one. However, it is preferably a particle size that does not allow the electrically conductive solid particles or powder to enter defects of the dielectric coating film.

According to the present invention, preferably the solvent in which the electrically conductive solid is dispersed is a solvent in which the solubility of the electrically conductive solid is very low or the electrically conductive solid does not dissolve therein. Thus, the dispersion can be obtained in which most of, preferably almost all of the electrically conductive solid does not dissolve. In the cases where the electrically conductive solid is polypyrrole and polythiophene, these electrically conductive polymers do not dissolve in most of solvents and thus the solvent for forming the dispersion can be selected from various types of organic and inorganic solvents. In terms of ease of handling and dispersion property of the electrically conductive solid, the solvent for forming the dispersion is preferably water. Alternatively, the solvent may be a mixed solvent of water and another solvent.

The concentration of the electrically conductive solid in the dispersion is not limited to a particular one, and is for example 1 to 50 wt %. If the concentration of the electrically conductive solid is less than 1 wt %, the electrically conductive solid layer is not sufficiently formed, which could cause defective characteristics. If the concentration is higher than 50 wt %, the electrically conductive solid layer is not appropriately formed, which could cause such defective characteristic as poorer voltage proofing. In order to appropriately form the electrically conductive solid layer and provide preferred capacitor characteristics, it is particularly preferable that the concentration of the electrically conductive solid in the dispersion is in the range of 3 to 20 wt %.

Here, in the case where the electrically conductive solid is an electrically conductive polymer, the method of preparing the dispersion may be for example (1) a method according to which the electrically conductive polymer is dispersed in the solvent, (2) a method according to which a monomer which is a precursor of the electrically conductive polymer is polymerized in the solvent which is a constituent element of the dispersion to produce the electrically conductive polymer, so as to obtain the dispersion including the electrically conductive polymer. When the method (2) is used, it is preferable to provide a refinement step of removing unreacted monomer and impurities for example after the polymerization reaction.

In this dispersion impregnation step, the method of impregnating the wound capacitor element with the dispersion is not limited to a particular one, and any known method is used. In particular, the method according to which the capacitor element is immersed in a dispersion contained in a vessel is preferably used because of relatively easy operation. The time for immersion depends on the size of the capacitor element and may be a few seconds to a few hours, preferably 1 to 30 minutes. The temperature for immersion is not limited to a particular one and may be 0 to 80° C., preferably 10 to 40° C. The dispersion impregnation step is preferably performed under a greatly reduced pressure, for example, 30 to 100 kPa, preferably 80 to 100 kPa, for the purpose of accelerating the impregnation and shortening the time for impregnation.

In order to further accelerate the impregnation, or to keep the dispersion state of the dispersion uniform, sonicating may be performed while the capacitor element is immersed.

<Dry Step>

In the subsequent step, the capacitor element which has been impregnated with the dispersion and thus to which the electrically conductive solid and the solvent are attached is dried so as to evaporate the solvent and form an electrically conductive solid layer on the surface of the dielectric coating film. At this time, usually the electrically conductive solid layer is formed not only on the surface of the dielectric coating film but also on the surface of the separator and the surface of the opposite cathode foil. This method of manufacturing the electrolytic capacitor of the present invention that includes the above-described dispersion impregnation step and this dry step can form the electrically conductive solid layer without causing damage to the dielectric coating film. Further, since the electrically conductive solid does not enter any defect on the dielectric coating film, short-circuit is rarely caused and thus the electrolytic capacitor having a small leakage current can be provided. Such an electrolytic capacitor of the present invention is excellent in voltage proofing property.

Further, the method of manufacturing the electrolytic capacitor of the present invention that includes the above-described dispersion impregnation step and this dry step does not require a washing process after the polymerization reaction that is conventionally necessary. Therefore, the time for manufacturing the electrolytic capacitor can be shortened and the number of manufacturing steps can be reduced.

In this dry step, as the method of drying the solvent attached to the capacitor element, such conventionally known drying as the one using a drying oven may be used. The drying temperature may be for example 80 to 300° C. In the case where the solvent is water, the temperature is preferably 100 to 200° C. that is a temperature of the boiling point or higher.

The dispersion impregnation step and the dry step may be repeated multiple times as required. By performing these steps multiple times, the coating ratio of the electrically conductive solid layer on the surface, which faces the opposite cathode foil, of the dielectric coating film increases. In other words, on the dielectric coating film's surface which faces the opposite cathode foil, the ratio of the portion coated with the electrically conductive solid layer increases. Thus, the solid capacitance realization ratio can be increased and accordingly a long-life electrolytic capacitor can be obtained. Here, "solid capacitance realization ratio" refers to a ratio between the capacitance before impregnation with an electrolytic solution described hereinafter and the capacitance after impregnation with the electrolytic solution, or the capacitance measured after removing an electrolytic solution from a completed electrolytic capacitor which has been impregnated with the electrolytic solution and the capacitance of the completed electrolytic capacitor impregnated with the electrolytic solution.

The coating ratio of the electrically conductive solid layer formed as described above on the dielectric coating film's surface facing the opposite cathode foil is, for example, 5 to 100%. The value of the coating ratio is estimated from the above-described solid capacitance realization ratio. In other words, since the solid capacitance realization ratio can be regarded as a value that directly reflects the coating ratio, the solid capacitance realization ratio obtained by the measurement is used as the coating ratio. The method of manufacturing the electrolytic capacitor of the present invention can control the coating ratio so that the coating ratio is within the range of 5 to 100%. Then, for example, the electrically conductive solid layer having a high coating ratio of, for example, approximately 80 to 100% can be formed. By forming the electrically conductive solid layer having such a high coating ratio, a long-life electrolytic capacitor can be provided.

Here, generally a higher solid capacitance realization ratio, namely a higher coating ratio of the electrically conductive solid layer on the dielectric coating film's surface facing the opposite cathode foil leads to deterioration of the repairability of the dielectric coating film. However, the electrolytic capacitor of the present invention has the electrically conductive solid layer and is impregnated with an electrolytic solution, such a usual defect is also improved.

<Electrolytic Solution Impregnation Step>

In the subsequent step, the capacitor element having the electrically conductive solid layer formed thereon is impregnated with an electrolytic solution. Thus, gaps of the electrically conductive solid layer formed on the dielectric coating film are impregnated with the electrolytic solution. In the case where electrically conductive solid layers are also formed on respective surfaces of the separator and the opposite cathode foil, gaps of these electrically conductive solid layers are impregnated with the electrolytic solution as well. Thus, the formation of the electrically conductive solid layer as well as the impregnation with the electrolytic solution provide improvement of the repairability of the dielectric coating film, and accordingly can further reduce the leakage current and further reduce the ESR. In other words, the electrolytic solution can cover the portion, where the electrically conductive coating film is not formed, of the dielectric coating film and additionally can enter defects that are present on the dielectric coating film, and accordingly can repair such defects. The electrolytic solution can enter the inside of defects present on the dielectric coating film since the electrically conductive coating film is not formed in the defects.

As the electrolytic solution, any conventionally known electrolytic solution may be employed. Preferably, however, an electrolytic solution containing a non-aqueous solvent and an organic salt is employed. Here, the organic salt refers to a salt in which at least one of the base and the acid that are constituent elements of the salt is organic. The non-aqueous solvent is preferably γ-butyrolactone or sulfolane or a mixture of them, since they have both of high reliability and a low specific resistance. The organic salt is preferably an organic amine salt. Here, the organic amine salt refers to a salt of an organic amine and an organic or inorganic acid. Among organic amine salts, a salt of an organic amine and an organic acid is preferably used, and examples thereof are, for example, triethylamine borodisalicylate, ethyldimethylamine phthalate, mono 1,2,3,4-tetramethylimidazolinium phthalate, mono 1,3-dimethyl-2-ethylimidazolinium phthalate, and a mixture of them.

The concentration of the organic salt in the non-aqueous solvent is not limited to a particular concentration, and a usually employed concentration may appropriately be employed. The concentration may be for example 5 to 50 wt %.

In the electrolytic solution impregnation step, the method of impregnating the capacitor element having the electrically conductive solid layer formed thereon with the electrolytic solution is not limited to a particular one, and any conventionally known method is employed. In particular, the method according to which the capacitor element is immersed in an electrolytic solution contained in a vessel is preferably used because of relatively easy operation. The time for immersion depends on the size of the capacitor element and may be for example one second to a few hours, preferably one second to five minutes. The temperature for immersion is not limited to a particular one and may be for example 0 to 80° C., preferably 10 to 40° C. The electrolytic solution impregnation step is preferably performed under a greatly reduced pressure, for example, 30 to 100 kPa for the purpose of accelerating the impregnation and shortening the time for impregnation.

Figure 2:
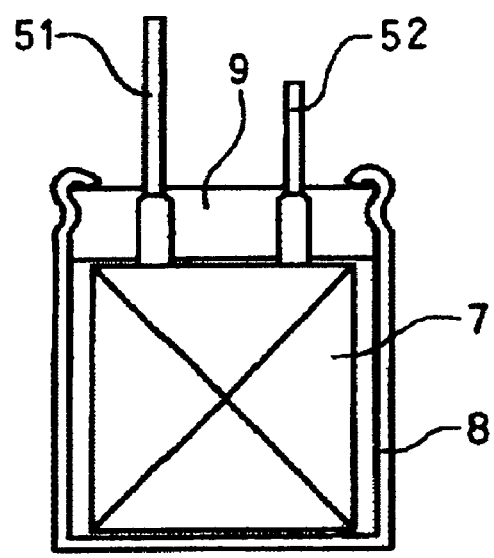
FIG. 2 is a cross-sectional view showing an exemplary electrolytic capacitor of the present invention.

After the above-described steps, as shown in FIG. 2, a capacitor element 7 that has the electrically conductive solid layer formed thereon and that is impregnated with the electrolytic solution is held in an aluminum casing 8 in the shape of a bottomed cylinder, a rubber packing 9 is attached in the opening of the casing and drawing and curling processes are performed on the casing. After this, while a rated voltage is applied, an aging process is performed for example at a temperature of approximately 125° C. for approximately one hour, and accordingly the electrolytic capacitor is completed.

Here, the electrolytic capacitor of the present invention has, as described above, the electrically conductive solid layer formed on the surface of the dielectric coating film, and the inside of defects on the dielectric coating film or gaps in the electrically conductive solid layer located on for example the dielectric coating film's surface where the electrically conductive solid layer is not formed are impregnated with the electrolytic solution. In the case where the electrically conductive solid layer is made of an electrically conductive polymer, the electrically conductive polymer is not substantially dissolved in the electrolytic solution. "Electrically conductive polymer is dissolved" herein not only refers to dissolution of the electrically conductive polymer itself but dissolution of matters resultant from dissociation or decomposition of the electrically conductive polymer and dissolution of a complex in the case where the electrically conductive polymer and a component in the electrolytic solution form the complex.

Depending on the combination of the electrically conductive polymer and the electrolytic solution, the electrically conductive polymer could dissolve in the electrolytic solution. However, this is not preferred in terms of the lifetime for example of the electrolytic capacitor. In this respect as well, preferably the electrically conductive polymer to be used is any of polypyrrole, polythiophene and derivatives of them as described above that do not dissolve in most solvents.

In the following, examples and comparative examples are used to describe the present invention in more detail. The present invention, however, is not limited to them.

EXAMPLES

Example 1

An aluminum capacitor element of the wound type for which the forming voltage (V) used for forming a dielectric coating film was the one as shown in Table 1, which had the dimension in the completed state (the outer dimension of an electrolytic capacitor in the state of being housed in an aluminum casing) of diameter 6.3 mm×height 6.0 mm, and which had a rated voltage of 10 V and a nominal capacitance of 100 μF was immersed in a dispersion containing polyethylenedioxythiophene and water as a solvent (polyethylenedioxythiophene concentration: 8 wt %) at 25° C. for 10 minutes under a high vacuum of 89 kPa so as to attach the dispersion to the dielectric coating film (dispersion impregnation step). While the immersion was performed, a sonicating process was performed. Then, the capacitor element was placed in a dry oven at 125° C. and kept therein for 30 minutes to evaporate the water and thereby form an electrically conductive solid layer (dry step). The dispersion impregnation step and the dry step were repeated three times in total. Subsequently, the capacitor element having the electrically conductive solid layer formed thereon was immersed in an electrolytic solution containing triethylamine borodisalicylate and γ-butyrolactone as a solvent (concentration of triethylamine borodisalicylate: 18 wt %) at 25° C. for 10 seconds so as to impregnate the capacitor element with the electrolytic solution (electrolytic solution impregnation step).

Then, the capacitor element was housed in an aluminum casing, a rubber packing was attached in an opening, and a drawing process and a curling process were performed. After this, while a voltage 1.15 times as high as the rated voltage shown in Table 1 was applied, an aging process was performed at approximately 125° C. for approximately one hour to fabricate the electrolytic capacitor.

For the electrolytic capacitor, the capacitance, ESR, tanδ (loss-angle tangent) and leakage current (LC) were measured. The results are shown in Table 1. Here, the capacitance is a capacitance (μF) at 120 Hz, the ESR is an ESR (mΩ) at 100 kHz and the LC is an LC (μA) when 30 seconds have passed from the time at which the rated voltage shown in Table 1 is applied.

TABLE 1

| | complete dimension diameter (mm) × height (mm) | forming voltage (V) | conductive polymer | organic salt | rated voltage (V) | nominal capacitance (μF) | capacitance (μF) | tanδ | ESR (mΩ) | LC (μA) |
|---|---|---|---|---|---|---|---|---|---|---|
| E. 1 | 6.3 × 6.0 | 18 | polyethylenedioxythiophene | A | 10 | 100 | 94.7 | 0.048 | 42.34 | 5.07 |
| E. 2 | 6.3 × 6.0 | 31 | polyethylenedioxythiophene | A | 16 | 68 | 66.5 | 0.034 | 41.23 | 2.26 |
| E. 3 | 6.3 × 6.0 | 102 | polyethylenedioxythiophene | A | 35 | 10 | 10.3 | 0.011 | 66.61 | 0.17 |
| E. 4 | 8 × 10.5 | 62 | polyethylenedioxythiophene | A | 35 | 100 | 95.3 | 0.022 | 17.51 | 13.74 |
| E. 5 | 8 × 10.5 | 135 | polyethylenedioxythiophene | A | 50 | 22 | 20.0 | 0.009 | 22.13 | 10.20 |
| E. 6 | 10 × 10.5 | 44 | polyethylenedioxythiophene | A | 25 | 270 | 299.3 | 0.032 | 15.72 | 8.77 |
| E. 7 | 10 × 10.5 | 102 | polyethylenedioxythiophene | A | 50 | 56 | 54.7 | 0.012 | 17.04 | 15.65 |
| E. 8 | 10 × 10.5 | 135 | polyethylenedioxythiophene | A | 63 | 39 | 37.0 | 0.011 | 18.75 | 12.33 |
| E. 9 | 10 × 10.5 | 44 | polyethylenedioxythiophene | B | 25 | 270 | 300.2 | 0.034 | 16.00 | 10.23 |
| E. 10 | 10 × 10.5 | 44 | polyethylenedioxythiophene | C | 25 | 270 | 298.6 | 0.030 | 15.23 | 11.30 |
| E. 11 | 10 × 10.5 | 44 | polyethylenedioxythiophene | D | 25 | 270 | 299.5 | 0.031 | 16.32 | 9.65 |
| E. 12 | 10 × 10.5 | 44 | polypyrrole | A | 25 | 270 | 285.6 | 0.036 | 20.36 | 11.23 |
| C. E. 1 | 6.3 × 6.0 | 18 | polyethylenedioxythiophene | A | 6.3 | 100 | 100.2 | 0.066 | 43.52 | 35.21 |

TABLE 1-continued

| | complete dimension diameter (mm) × height (mm) | forming voltage (V) | conductive polymer | organic salt | rated voltage (V) | nominal capacitance (µF) | capacitance (µF) | tanδ | ESR (mΩ) | LC (µA) |
|---|---|---|---|---|---|---|---|---|---|---|
| C. E. 2 | 8 × 10.5 | 62 | polyethylenedioxythiophene | A | 16 | 100 | 98.6 | 0.035 | 21.23 | 56.88 |
| C. E. 3 | 10 × 10.5 | 102 | polyethylenedioxythiophene | A | 25 | 47 | 48.6 | 0.015 | 22.33 | 32.15 |

* E.: Example, C.E.: Comparative Example

Examples 2-12

Electrolytic capacitors were each formed by a method similar to that of Example 1 except that the rated voltage and the nominal capacitance, the dimension in the completed state (diameter in mm×height in mm), the forming voltage (V), the electrically conductive polymer and the organic salt contained in the electrolytic solution are those as shown in Table 1. The concentration (wt %) of the electrically conductive polymer in the dispersion and the concentration (wt %) of the organic salt in the electrolytic solution are identical to those of Example 1. For these electrolytic capacitors, the capacitance, ESR, tan δ (loss-angle tangent) and leakage current (LC) were measured. The results as shown in Table 1. Organic salts A, B, C, D shown in Table 1 are respectively triethylamine borodisalicylate, ethyldimethylamine phthalate, mono 1,2,3,4-tetramethylimidazolinium phthalate, mono 1,3-dimethyl-2-ethylimidazolinium phthalate.

Comparative Examples 1-3

Aluminum capacitor elements of the wound type having the dimension in the completed state (the outer dimension of an electrolytic capacitor in the state of being contained in an aluminum casing) as shown in Table 1 were each immersed in an ethanol solution containing 20 wt % of ethylenedioxythiophene at 25° C. for 10 seconds and thereafter immersed in an ethanol solution containing 50 wt % of iron p-toluene sulfonate serving as an oxidizing agent at 25° C. for 2 to 3 minutes so as to perform oxidation polymerization and form a layer of polyethylenedioxythiophene within the capacitor element. Then, the element was washed with water to remove impurities and the oxidizing agent and thereafter dried at 100° C. Then, the capacitor element having the polyethylenedioxythiophene layer formed therein was immersed in an electrolytic solution containing triethylamine borodisalicylate and γ-butyrolactone as a solvent (triethylamine borodisalicylate concentration: 18 wt %) at 25° C. for 10 seconds for impregnating the capacitor element with the electrolytic solution.

Then, the capacitor element was housed in an aluminum casing, a rubber packing was attached in an opening of the casing, and a drawing process and a curling process were performed. After this, while a voltage 1.15 times as high as the rated voltage shown in Table 1 was applied, an aging process was performed at approximately 125° C. for approximately one hour to fabricate the electrolytic capacitor. Here, the forming voltage used for producing the dielectric coating film, the rated voltage and the nominal capacitance of the capacitor element as used are those as shown in Table 1.

For the electrolytic capacitors each, the capacitance, ESR, tan δ (loss-angle tangent) and leakage current (LC) were measured. The results are shown in Table 1.

From the results shown in Table 1, the following are found. When a comparison is made between Example 1 and Comparative Example 1 that have the same dimension in the completed state and the same forming voltage, the electrolytic capacitor of Example 1 has a considerably smaller leakage current (LC) than that of the electrolytic capacitor of Comparative Example 1 in spite of the large applied voltage (rated voltage) of Example 1. It is seen from this that the method of the present invention can greatly reduce the LC of the electrolytic capacitor. A reason why the LC is reduced seems to be the fact that the electrically conductive polymer does not enter a defect of the oxidized coating film and the electrolytic solution enters the defect instead and accordingly an excellent repair action of the oxidized coating film is obtained. Therefore, to the electrolytic capacitor of the present invention, a higher voltage can be applied. In other words, the electrolytic capacitor of the present invention can be used at a higher rated voltage. A reason for this seems to be the fact that the method of the present invention causes almost no deterioration of the oxidized coating film in the manufacturing steps. Similar results are derived from a comparison between Example 4 and Comparative Example 2 and a comparison between Example 7 and Comparative Example 3.

Further, when a comparison is made between Example 6 and Comparative Example 3 that have the same dimension in the completed state and the same rated voltage, the capacitance of the electrolytic capacitor of Example 6 is 6 times as large as the capacitance of the electrolytic capacitor of Comparative Example 3. Therefore, it is seen that the method of the present invention can increase the capacitance of the electrolytic capacitor. The same results can be derived from Examples 9 to 12 having respective conductive polymers or organic salts of types different from each other. The fact that the capacitance of the electrolytic capacitor can be increased means that the electrolytic capacitor can be further reduced under the conditions of almost the same rated voltage and capacitance.

Example 13

Measurement of Solid Capacitance Realization Ratio and Confirmation of Effects of Electrolytic Solution:

Two aluminum capacitor elements of the wound type which had the dimension in the completed state (the outer dimension of an electrolytic capacitor in the state of being housed in an aluminum casing) as shown in Table 2 were each immersed in a dispersion containing polyethylenedioxythiophene and water as a solvent (polyethylenedioxythiophene concentration: 8 wt %) at 30° C. for 10 minutes under a high vacuum of 89 kPa so as to attach the dispersion to the dielectric coating film (dispersion impregnation step). While the immersion was performed, a sonicating process was performed. Then, the capacitor element was placed in a dry oven at 125° C. and kept therein for 30 minutes to evaporate the water and thereby form an electrically conductive solid layer (dry step). The dispersion impregnation step and the dry step were repeated three times in total. Subsequently, one of the capacitor elements having the electrically conductive solid layer formed thereon was housed in an aluminum casing, a rubber packing was attached in an opening of the casing, and a drawing process and a curling process were performed. After this, while a voltage 1.15 times as high as the rated voltage shown in Table 2 was applied, an aging process was performed at approximately 125° C. for approximately one hour to fabricate the electrolytic capacitor. For the electrolytic capacitor, the capacitance, ESR and leakage current (LC) were measured (these are referred to respectively as capacitance 1, ESR1 and LC1). The results are shown in Table 2. Here, the capacitance is a capacitance (µF) at 120 Hz, the ESR is an ESR (mΩ) at 100 kHz and the LC is an LC (µA) when 30 seconds have passed from the time at which the rated voltage shown in Table 2 is applied.

Then, the other one of the two capacitor elements having the electrically conductive solid layers formed thereon was immersed in an electrolytic solution containing triethylamine borodisalicylate and γ-butyrolactone as a solvent (triethylamine borodisalicylate concentration: 18 wt %) at 25° C. for 10 seconds to impregnate the capacitor element with the electrolytic solution. Then, the capacitor element was housed in an aluminum casing, a rubber packing was attached in an opening of the casing, and a drawing process and a curling process were performed. After this, while a voltage 1.15 times as high as the rated voltage shown in Table 2 was applied, an aging process was performed at approximately 125° C. for approximately one hour to fabricate the electrolytic capacitor. Here, the forming voltage (V) used for producing the dielectric coating film as well as the rated voltage and the nominal capacitance of the capacitor element used in the present Example are those as shown in Table 2.

For the electrolytic capacitor, the capacitance, ESR and leakage current (LC) were measured (these are referred to respectively as capacitance 2, ESR2 and LC2). The results are shown in Table 2. Here, the capacitance is a capacitance (µF) at 120 Hz, the ESR is an ESR (mΩ) at 100 kHz and the LC is an LC (µA) when 30 seconds have passed from the time at which the rated voltage shown in Table 2 is applied. The solid capacitance realization ratio is determined using the expression: capacitance 1/capacitance 2×100 (%).

As seen from Table 2, the solid capacitance realization ratio of the electrolytic capacitors fabricated in the present example is such a high ratio of 86.1 to 99.3% and thus the coating ratio of the electrically conductive solid layer on the surface of the dielectric coating film is also considerably high. Further, from the fact that the solid capacitance realization ratio is high, it is seen that particles of polyethylenedioxythiophene which is an electrically conductive polymer enter the inside of fine etching holes of the anode foil. Furthermore, it is seen that impregnation with the electrolytic solution can reduce the ESR and leakage current (LC).

The capacitance (µF), tan δ, ESR (mΩ) and LC (µA) of the above-described Examples and Comparative Examples were each measured in the following manner.

(1) capacitance, tan δ and ESR: Measurements were taken using a 4263B LCR meter manufactured by Agilent Corporation.

(2) LC: Measurements were taken using a 3488A multimeter manufactured by Hewlett Packard Company and a 34401A switch control unit manufactured by Hewlett Packard Company.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an electrolytic capacitor comprising:
 a first dispersion impregnation step of impregnating, with a dispersion containing electrically conductive solid particles or powder and a solvent, a capacitor element having an anode foil with a dielectric coating film formed thereon and an opposite cathode foil that are wound with a separator interposed therebetween;
 a second dry step of evaporating said solvent after said dispersion impregnation step to form an electrically conductive solid layer on a surface of said dielectric coating film; and
 a third electrolytic solution impregnation step of impregnating a gap in said electrically conductive solid layer

TABLE 2

| complete dimension diameter (mm) × height (mm) | forming voltage (V) | rated voltage (V) | nominal capacitance (µF) | capacitance 1 (µF) | capacitance 2 (µF) | solid capacitance realization ratio (%) | ESR1 (mΩ) | ESR2 (mΩ) | LC1 (µA) | LC2 (µA) |
|---|---|---|---|---|---|---|---|---|---|---|
| 6.3 × 6.0 | 7 | 4 | 180 | 176.5 | 205.1 | 86.1 | 67.0 | 50.3 | 23.56 | 7.52 |
| 6.3 × 6.0 | 12.5 | 6.3 | 120 | 122.8 | 136.0 | 90.3 | 71.8 | 51.9 | 45.62 | 6.38 |
| 6.3 × 6.0 | 31 | 16 | 68 | 64.0 | 70.4 | 90.9 | 92.3 | 59.8 | 10.66 | 2.23 |
| 6.3 × 6.0 | 44 | 16 | 47 | 45.7 | 48.8 | 93.6 | 110.7 | 76.7 | 12.56 | 1.10 |
| 6.3 × 6.0 | 80 | 25 | 27 | 27.2 | 27.4 | 99.3 | 191.7 | 93.2 | 21.36 | 1.25 |
| 6.3 × 6.0 | 102 | 35 | 10 | 11.5 | 11.8 | 97.5 | 199.1 | 107.7 | 5.68 | 0.25 |
| 8 × 10.5 | 7 | 6.3 | 680 | 609.2 | 690.1 | 88.3 | 23.5 | 17.3 | 22.69 | 8.66 |
| 8 × 10.5 | 14 | 10 | 390 | 375.9 | 429.1 | 87.6 | 31.5 | 20.5 | 53.12 | 11.23 |
| 8 × 10.5 | 31 | 16 | 220 | 201.7 | 227.9 | 88.5 | 38.9 | 26.9 | 32.14 | 10.63 |
| 8 × 10.5 | 44 | 25 | 100 | 106.4 | 109.4 | 97.3 | 30.6 | 20.6 | 26.30 | 14.58 |
| 8 × 10.5 | 62 | 35 | 100 | 97.1 | 101.3 | 95.9 | 32.9 | 21.8 | 32.61 | 12.53 |
| 8 × 10.5 | 135 | 50 | 22 | 22.9 | 23.5 | 97.4 | 50.7 | 30.3 | 54.22 | 12.31 |
| 8 × 10.5 | 150 | 63 | 12 | 13.7 | 13.9 | 98.6 | 63.0 | 35.8 | 39.64 | 15.22 |
| 10 × 10.5 | 5 | 4 | 1200 | 1051.9 | 1212.4 | 86.8 | 21.6 | 15.6 | 33.40 | 10.86 |
| 10 × 10.5 | 11 | 6.3 | 820 | 796.2 | 893.1 | 89.2 | 19.7 | 14.7 | 25.98 | 9.58 |
| 10 × 10.5 | 18 | 10 | 680 | 673.9 | 742.9 | 90.7 | 18.4 | 13.9 | 36.41 | 10.00 |
| 10 × 10.5 | 44 | 25 | 270 | 300.5 | 311.8 | 96.4 | 24.5 | 17.8 | 40.23 | 8.65 |
| 10 × 10.5 | 62 | 35 | 150 | 155.9 | 159.1 | 98.0 | 22.9 | 16.8 | 36.98 | 8.96 |
| 10 × 10.5 | 102 | 50 | 56 | 59.7 | 60.3 | 99.0 | 30.5 | 21.0 | 42.79 | 15.68 | with an electrolytic solution; wherein the steps are performed in order from first to third.

2. The method of manufacturing an electrolytic capacitor according to claim 1, wherein
in said dry step, the electrically conductive solid layer is formed on the surface of said dielectric coating film and on respective surfaces of said separator and said opposite cathode foil.

3. The method of manufacturing an electrolytic capacitor according to claim 1, wherein
an electrically conductive solid of which said electrically conductive solid layer is composed includes an electrically conductive polymer,
said solvent includes water, and
said electrolytic solution includes a non-aqueous solvent and an organic salt.

4. The method of manufacturing an electrolytic capacitor according to claim 3, wherein
said electrically conductive polymer includes one element or at least two elements selected from the group consisting of polypyrrole, polythiophene and derivatives thereof,
said non-aqueous solvent includes γ-butyrolactone and/or sulfolane, and
said organic salt includes an organic amine salt.

5. The method of manufacturing an electrolytic capacitor according to claim 3, wherein
said electrically conductive polymer is polyethylenedioxythiophene.

6. The method of manufacturing an electrolytic capacitor according to claim 3, wherein
said electrically conductive polymer is not substantially dissolved in said electrolytic solution.

7. An electrolytic capacitor manufactured by the method as recited in claim 1.

* * * * *